United States Patent
Goel et al.

(10) Patent No.: US 9,879,871 B2
(45) Date of Patent: Jan. 30, 2018

(54) HVAC SYSTEMS AND METHODS WITH REFRIGERANT LEAK DETECTION

(71) Applicant: Lennox Industries Inc., Richardson, TX (US)

(72) Inventors: Rakesh Goel, Irving, TX (US); Mark Olsen, Carrollton, TX (US); Hermon Alan Boyd, Red Oak, TX (US)

(73) Assignee: Lennox Industries Inc., Richardson, TX (US)

( * ) Notice: Subject to any disclaimer, the term of this patent is extended or adjusted under 35 U.S.C. 154(b) by 833 days.

(21) Appl. No.: 14/304,871

(22) Filed: Jun. 13, 2014

(65) Prior Publication Data
US 2015/0362204 A1    Dec. 17, 2015

(51) Int. Cl.
F24F 11/00    (2006.01)
G01M 3/04     (2006.01)
F25B 1/00     (2006.01)

(52) U.S. Cl.
CPC .......... *F24F 11/001* (2013.01); *F24F 11/008* (2013.01); *F24F 11/0079* (2013.01); *G01M 3/04* (2013.01); *F24F 2011/0084* (2013.01); *F25B 1/00* (2013.01); *F25B 2400/12* (2013.01); *Y02B 30/746* (2013.01)

(58) Field of Classification Search
None
See application file for complete search history.

(56) References Cited

U.S. PATENT DOCUMENTS

| | | | |
|---|---|---|---|
| 3,685,577 A | 8/1972 | Goodgion et al. | |
| 4,437,868 A * | 3/1984 | Kuhlman | F24F 7/013 454/341 |
| 6,471,136 B1 | 10/2002 | Chatterjee et al. | |
| 6,655,161 B1 | 12/2003 | Koo | |
| 2002/0072322 A1* | 6/2002 | Sharp | F24F 11/0001 454/229 |
| 2002/0178738 A1 | 12/2002 | Taira et al. | |
| 2004/0058637 A1* | 3/2004 | Laiti | B01D 46/0028 454/229 |
| 2005/0086952 A1 | 4/2005 | Nonaka et al. | |

(Continued)

FOREIGN PATENT DOCUMENTS

AU    2013101100 A4    9/2013
EP    1083392 A2       3/2001

(Continued)

OTHER PUBLICATIONS

Partial European Search Report received in European Application No. 15169692.9, dated Apr. 8, 2016, 6 pages.

(Continued)

*Primary Examiner* — Len Tran
*Assistant Examiner* — Alexis Cox
(74) *Attorney, Agent, or Firm* — Hubbard Johnston, PLLC

(57) ABSTRACT

Systems and methods are disclosed that involve detecting a flammable refrigerant associated with a heating, ventilating, and air conditioning (HVAC) system. In one instance a damper covers an access port allowing a single sensor to monitor at least two separate spaces. In another instance, a multi-probe sensor allows a single sensor to monitor at least two separate spaces. Other systems and methods are presented.

13 Claims, 5 Drawing Sheets

(56) References Cited

U.S. PATENT DOCUMENTS

| | | | |
|---|---|---|---|
| 2005/0103029 A1* | 5/2005 | Kawahara | F25D 29/008 |
| | | | 62/126 |
| 2006/0048524 A1 | 3/2006 | Komatsu | |
| 2008/0295530 A1 | 12/2008 | Sawada et al. | |
| 2010/0035536 A1 | 2/2010 | Brooks et al. | |
| 2012/0090383 A1 | 4/2012 | Lopez et al. | |
| 2013/0213068 A1* | 8/2013 | Goel | F25B 49/005 |
| | | | 62/129 |

FOREIGN PATENT DOCUMENTS

| | | |
|---|---|---|
| EP | 1475588 A1 | 11/2004 |
| JP | 2003322445 A | 11/2003 |
| JP | 2009092326 A | 4/2009 |

OTHER PUBLICATIONS

Ashrae Standard—"Designation and Safety Classification of Refrigerants," Ansi/Ashrae Standard 34/2007, 2007, 6 pages (preview).

Propane and Methane Gas Detector for Recreational Vehicle Use—Model 40-441A and Model 40-442A User's Manual, MTI Industries, Inc. 1999, 3 pages.

\* cited by examiner

HVAC SYSTEMS AND METHODS WITH REFRIGERANT LEAK DETECTION

FIELD

This application is directed, in general, to heating, ventilating and air conditioning or cooling (HVAC) systems, and more specifically, to methods and systems with economical refrigerant leak detection.

BACKGROUND

Heating, ventilating, and air conditioning (HVAC) systems can be used to regulate the environment within an enclosed space. Typically, an air blower is used to pull air (i.e., return air) from the enclosed space into the HVAC system through ducts and push the air into the enclosed space through additional ducts after conditioning the air (e.g., heating, cooling or dehumidifying the air). Unless otherwise indicated, as used throughout this document, "or" does not require mutual exclusivity. Various types of HVAC systems may be used to provide conditioned air for enclosed spaces.

The cooling aspect of the HVAC system utilizes a working fluid, or refrigerant, that cycles through various phases to realize cooling at a desired location. In the past, refrigerants were selected that were in large measure non-toxic and non-flammable. These refrigerants were not, however, as desirable with respect to global warming potential. In more recent times, a push has been made to use refrigerants that have a low or lower global warming potential. Because such refrigerants are often at least mildly flammable, the refrigerant could pose a potential risk to the user in some situations.

BRIEF DESCRIPTION

Illustrative embodiments of the present invention are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Figure 1:
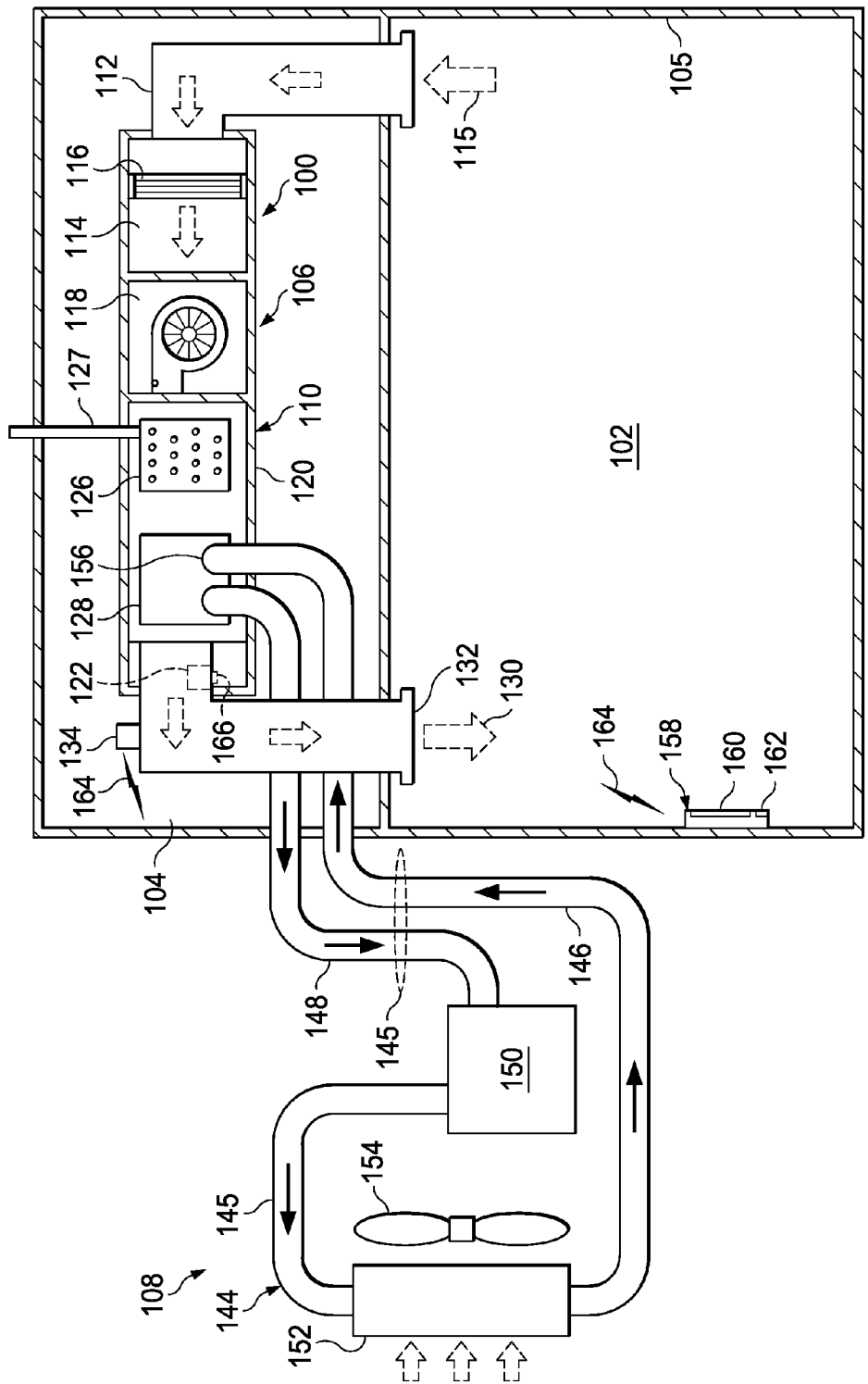
FIG. 1 is a schematic elevation view diagram of an HVAC system according to an illustrative embodiment.

Referring now to the drawings and primarily to FIG. 1, a heating, ventilating, and air conditioning (HVAC) system 100 is presented. The HVAC system 100 is for providing conditioned air to a first closed space 102, such as the interior of a building. At least a portion of the HVAC system 100 is disposed within a second closed space 104, or equipment space. The spaces may be defined by a plurality of walls 105. In this embodiment, a portion 106 of the system 100 is located within the building, i.e., within the second closed space 104, and a portion 108 outside the building.

The HVAC system 100 includes an HVAC unit 110 that is disposed within the second closed space 104, or equipment space. The HVAC unit 110 includes a return air duct 112 that receives air 115 from the first closed space 102. The return air duct 112 may include or be coupled to a transition duct 114 that may include one or more filters 116. A blower 118 pulls the return air into the return air duct 112. The blower 118 is fluidly coupled to the return air duct 112. The blower 118 moves air into a conditioning compartment 120.

Figure 2:
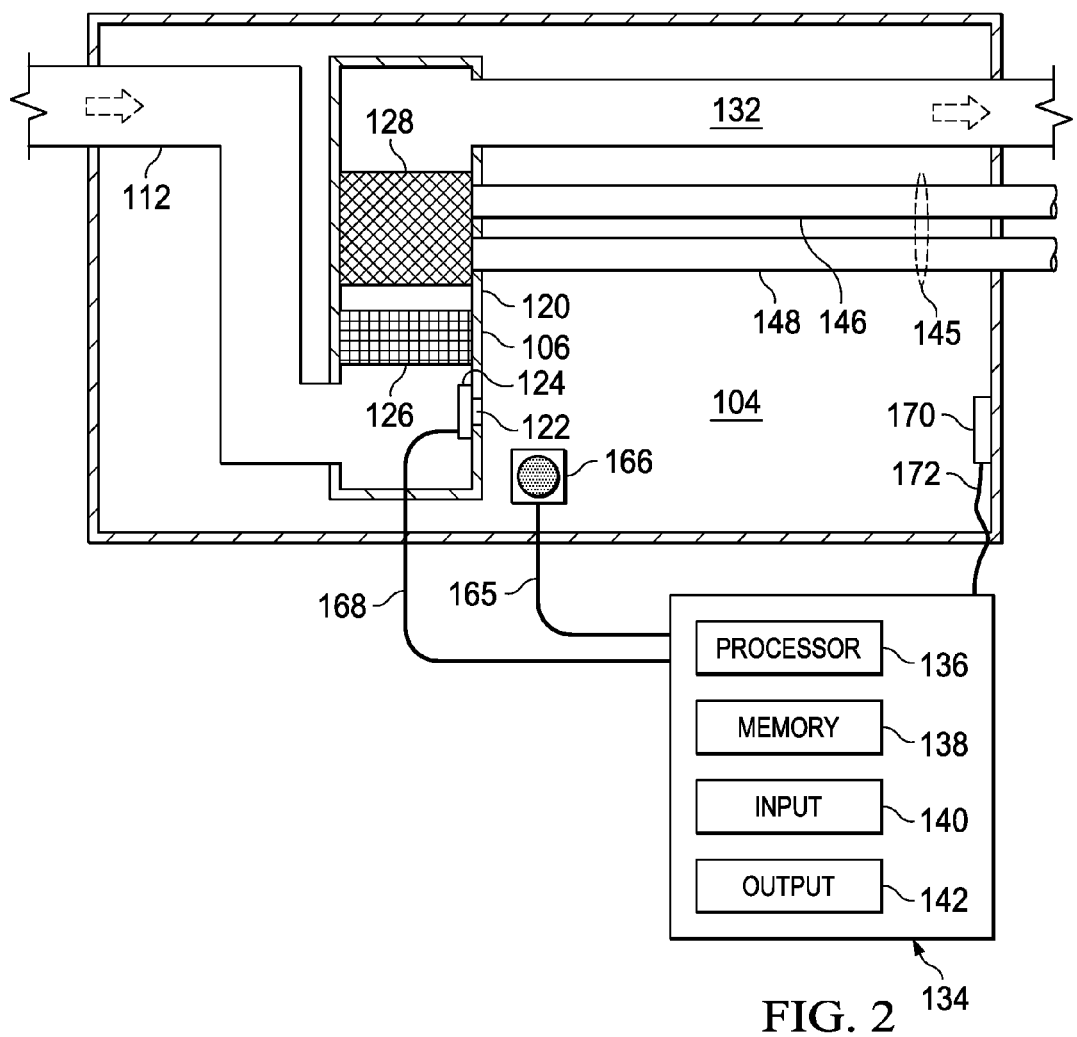
FIG. 2 is a schematic plan view diagram of portion of an HVAC having a leak detector according to an illustrative embodiment.

The conditioning compartment 120 is fluidly coupled to the blower 118 for receiving air therefrom to be treated. The conditioning compartment 120 is formed with a plurality of compartment walls and formed with a sampling port 122 on one compartment wall. The conditioning compartment 120 may include a portion of a delivery duct 132 in some embodiments. The sampling port 122 is selectively covered by a damper 124 (FIG. 2). The damper 124 is includes activation devices, e.g., motor or solenoid or other motive device, whereby a damper-control signal may be sent to the damper 124 to open or close the damper 124.

The conditioning compartment 120 includes a heating device 126 and a cooling unit 128. The order of the heating device 126 and cooling unit 128 could be varied. The heating device 126 may be a furnace, hot water manifold, an electric heating element, or any source of heat. If the heating device 126 is a furnace it may include flue pipe 127. The heating device 126 is fluidly coupled to the conditioning compartment 120 for selectively heating air therein. The cooling unit 128 is fluidly coupled to the conditioning compartment 120 for selectively cooling air therein. The cooling unit 128 includes a flammable refrigerant, or working fluid. The cooling unit 128 may be an evaporator coil or device for receiving heat from the air flowing over the cooling unit. The cooling unit 128 includes at least one heat exchange surface.

While the system 100 will work with many refrigerants, the system 100 is primarily concerned with flammable refrigerants. Flammable refrigerants include even mildly flammable refrigerants that if exposed to an ignition source under certain conditions could pose a risk of fire. Accordingly, leak detection is an issue of considerable interest and will be described further below. The flammable refrigerant may be, without limitation, any of the following: any A2L, A2, A3, B2, or B3 refrigerant; R1234YF by Honeywell and DuPont; methylene chloride (R30); methyl chloride (R40); ethane (R170); propane (R290); N-Butane (R600); isobutene (R-600A); methyl formate (R611); ammonia (R717); sulfur dioxide (R764); ethylene (R1150); hydrocarbon refrigerants; halo-hydrocarbon blends; difluoromethane (R-32); etc.

Whether heated by heating device 128 or cooled by cooling unit 128, the conditioning compartment 120 produces a treated air 130 that is delivered into the first closed space 102 by the delivery duct 132. The delivery duct 132 is fluidly coupled to the conditioning compartment 120 for discharging the treated air 130 from the conditioning compartment 120 into the first closed space 102.

Referring additionally to FIG. 2, the processing unit 134 is associated with the HVAC unit 110. The processing unit 134 includes one or more processors 136 and one or more memories 138. The processing unit 134 may include an input 140 (e.g., touchpad, keyboard, etc.) and an output 142 (e.g., display). The processing unit 134 may be communicatively coupled (in communication through wires, wireless, or other means) with the blower 118, damper 124, or other devices to be monitored or controlled within the system 100.

The one or more processors 136 are configured to execute one or more sequences of instructions, programming or code stored on or in the one or more memories 138, which includes all types of memory devices and includes readable medium used for storage. The processor 136 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network or any like suitable entity that can perform calculations or other manipulations of data. The memory 138 may include one or more the following: random access memory (RAM), flash memory, read only memory (ROM), programmable read only memory (PROM), erasable PROM, registers, hard disks, removable disks, CD-ROMS, DVDs, or any other suitable storage devices.

The cooling unit 128 is associated with a cooling subsystem 144. The cooling subsystem 144 is any system that is operational to develop a chilled working fluid for receiving heat within the cooling unit 128. In one embodiment, the cooling subsystem 144 includes a closed-conduit pathway 145, or circuit. The flammable refrigerant is disposed within the closed conduit pathway 145. The closed-conduit pathway 145 includes a first refrigerant line 146 and a second refrigerant line 148. It will be appreciated that the first and second refrigerant lines 146, 148 in this embodiment are disposed partially within the second closed space 104 and if they were to leak, could deliver the flammable refrigerant into the second closed space 104 and thereby pose a potential safety risk—particularly if a source of ignition is present. Similarly if the refrigerant leaks within the cooling unit 128 and therefore within the conditioning compartment 120, a risk may be posed by potential ignition sources, e.g., an open flame from a furnace. Additional spaces may need detectors, particularly if a refrigerant line in the space has a joint.

The cooling subsystem 144 also includes a compressor 150 fluidly coupled to the closed-conduit pathway 145 for compressing the flammable refrigerant therein. A condenser 152 is fluidly coupled to the closed-conduit pathway 145 downstream of the compressor 150 for cooling the refrigerant. The condenser 152 may include on or more fans 154. An expansion device 156 is coupled to the closed-conduit pathway 145 downstream of the condenser 152 for decreasing a pressure of the refrigerant at the cooling unit 128. The cooling unit 128 includes a heat-exchange surface (not explicitly shown) and is fluidly coupled to the closed-conduit pathway 145 for receiving the flammable refrigerant.

A control unit 158 may be disposed within the first closed space 102. The control unit 158 may include a thermostat for providing control signals to the blower 118, heating device 126, or cooling unit 128 (or cooling subsystem) in response to a temperature in the first closed space 102. The control unit 158 may include an input device and a display, such as a touch-screen display 160 and a speaker 162 for audible alerts or instructions. The control unit 158 is communicatively coupled, e.g., by wireless signal 164 or wired signal, to the processing unit 134. In some embodiments, the control unit 158 and the processing unit 134 may be the same unit.

A flammable-component detector 166 is disposed within the second closed space 104 and positioned proximate the HVAC unit 110 such that any flammable refrigerant within the conditioned compartment 120 would flow through the sampling port 122 when the damper 124 (FIG. 2) is open and onto the flammable-component detector 166. The flammable-component detector 166 is operable to produce a detection signal indicative of the level of the flammable component detected or a signal that a lower threshold has been reached.

Referring now primarily to FIG. 2, a portion of an HVAC system 100 is presented that is analogous most respects to that of FIG. 1. The HVAC unit 110 is shown disposed within the second closed space 104. In this figure, the damper 124 covering sampling port 122 is shown. The damper 124 is communicatively coupled to a processing unit 134, such as a by a wireless connection or by wires 168. The processing unit 134 is communicatively coupled to the damper 124 for selectively providing a damper-control signal thereto to open and close the damper 124. The damper 124 includes an activation device to open or close the damper over the sampling port 122. Located proximate to the sampling port 122 and damper 124 and preferably at a lower elevation is a flammable-component detector 166. The flammable-component detector 166 is communicatively coupled to the processing unit 134 by a wireless connection or by a wired connection 165 or other means.

The processing unit 134 may be further communicatively coupled to the blower 118 to receive an operational-status signal from the blower 118. In some embodiments, the processing unit 134 is able to monitor operation of the blower 118 and provide control signals thereto to effect the operation of the blower 118.

The flammable-component detector 166 is positioned so that if there is a leak of the flammable refrigerant within the conditioning compartment 120, when the sampling port 120 is in an open position, the refrigerant will pour from the sampling port 120 onto the flammable-component detector 166. In this way, the flammable-component detector 166 is able to monitor and detect a leak of refrigerant within the conditioning compartment 120 when the damper 124 is open and also monitor the second closed space 104 where the flammable-component detector 166 is positioned. It should be noted that when the blower (see 118 in FIG. 1) is operative, any refrigerant leak is diluted and therefore should pose no risk. When the blower is off, the damper 124 may be opened and potential leaks monitored.

If the detection signal from the flammable-component detector 166 that is delivered to the processing unit 134 exceeds an alert threshold, responsive action is taken. The response may include sending an alert signal to the control unit 158. The alert signal may be presented as a visual alert on the screen 160, an audible alert through speaker 162 (FIG. 1), or other alert. This allows an active warning to the user in the first closed space 102 of the potential danger posed elsewhere, namely in the conditioning compartment 120 or second closed space 104.

The responsive action may include closing the damper 124 and activating the blower 118 (FIG. 1) or may include activating a ventilator 170. The ventilator 170 may be a fan that pulls air out of the second closed space 104 or moves air into the second closed space 104 for the purpose of diluting any leaked refrigerant. The ventilator 170 is communicatively coupled to the processing unit 134, e.g., by wireless or wired 172 connection or other means.

In one illustrative embodiment, the at least one processor 136 and at least one memory 138 are configured to perform the following steps: receive the operational-status signal from the blower 118; open the damper 124 when the operational-status signal from the blower indicates that the blower 118 is not operating; and close the damper 124 when the operational-status signal from the blower 118 indicates that the blower 118 is operating. The at least one processor 136 and at least one memory 138 may be further configured to monitor the detection signal from the flammable-component detector 166 and to send an alert when the detection signal is indicative a flammable component at least equal to an alert threshold. The alert may be an alert signal sent to the control unit 158 (FIG. 1) present a visual or audible alert for the user in the first closed space 102. The user may have to select something to clear the alert. The processing unit 134 may prepare a blower-control signal to active the blower in response a detection signal indicative of a flammable component at or near an alert threshold. In another embodiment, the processing unit 134 also prepares a ventilation-activation signal that is sent to the ventilation blower 170 to assist with diluting any leaked refrigerant in the second closed space 104, or equipment space.

Figure 3:
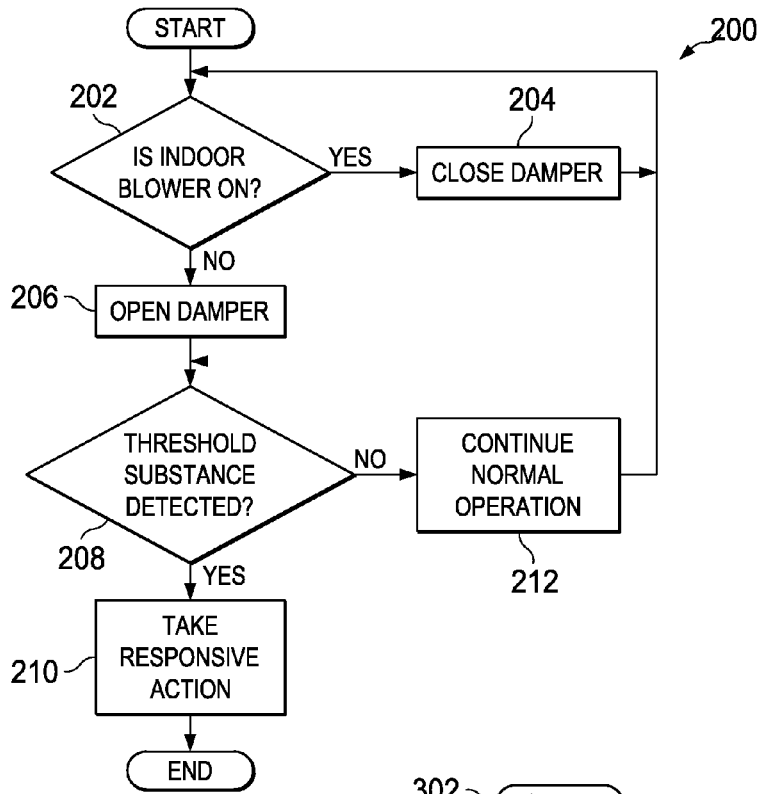
FIG. 3 is an illustrative flow chart of an aspect of a method of detecting a refrigerant leak according to an illustrative embodiment.

It will be appreciated that the processing unit 134 may be configured to carryout numerous steps or functions within the system 100. As one example, reference is now made primarily to FIG. 3. In an illustrative process 200 in FIG. 3, the process 200 first considers whether the blower is on at interrogatory 202. If it is on, any refrigerant leak within the conditioning compartment 120 would be diluted and so the damper 124 is closed at step 204 to prevent air from entering the conditioning compartment 120. If the blower is not on, a leak could be an issue, and so the damper 124 is opened at step 206. In this way, the flammable-component detector 166 is effectively monitoring both the second closed space 104 and the conditioning compartment 120. If the flammable-component detector 166 detects a level of one or more flammable components that exceeds an alert threshold, responsive action is taken. This question is considered at interrogatory 208. If the alert threshold is exceeded, responsive action is taken at step 210. The response may include sounding an audible alarm, presenting a visual alert, sending an email to the user or service provide or emergency personnel, activating the blower 118, activating a ventilator 170, etc. If the flammable-component detector 166 does not detect one or more flammable components exceeding an alert threshold, normal operation continues as shown as step 212 and the process returns to 202.

The alert threshold may be set at a conservative percentage of a lower flammability limit. For example, the alert threshold may be set at 25% of the lower flammability limit for the flammable refrigerant being used. Other safety margins—greater or lesser than 25% —may be used. For example, without limitation, the alert threshold may be 10, 20, 30, 40, or 50% of the lower flammability limit.

Figure 4:
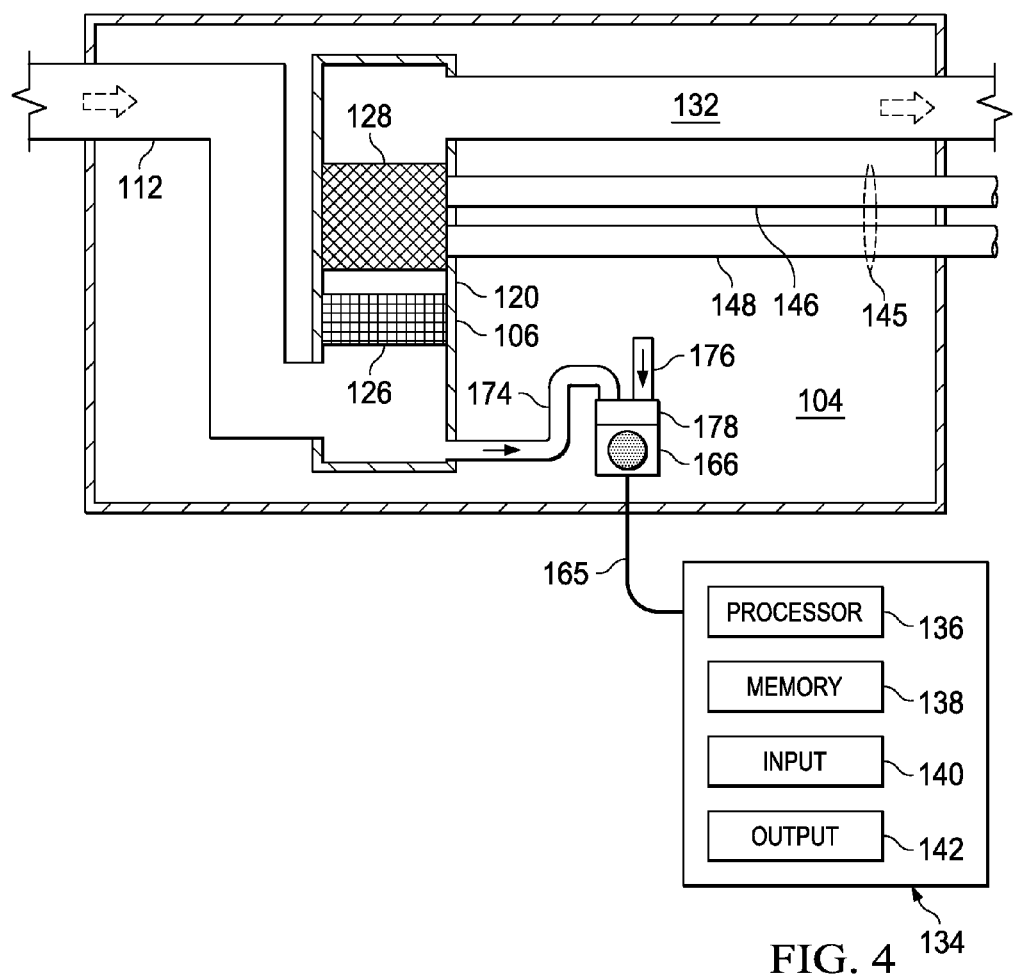
FIG. 4 is a schematic plan view diagram of portion of an HVAC having a leak detector according to an illustrative embodiment.

Referring now primarily to FIG. 4, a portion of an HVAC system 100 is shown. The HVAC system 100 of FIG. 4 is analogous in most respects to the HVAC system of FIG. 1, and accordingly, some parts are labeled but not further described here. In addition, components referenced but not explicitly shown are analogous to those previously presented. In this embodiment, however, there is no sample port, but rather a flammable-component detector 166 has a first probe 174 and a second probe 176 fluidly coupled to the detector 166. The first probe 174 is fluidly coupled to the flammable-component detector 166 and to the conditioning compartment 120. The second probe 176 is fluidly coupled to the flammable-component detector 166 and to the second closed space 104. This illustrative embodiment also includes a selector 178 for selectively providing fluid flow through the first probe 174 and for selectively providing fluid flow through the second probe 176 to the flammable-component detector 166. The selector 178 may be a plurality of valves, a plurality of sample blowers, or other devices.

Figure 5:
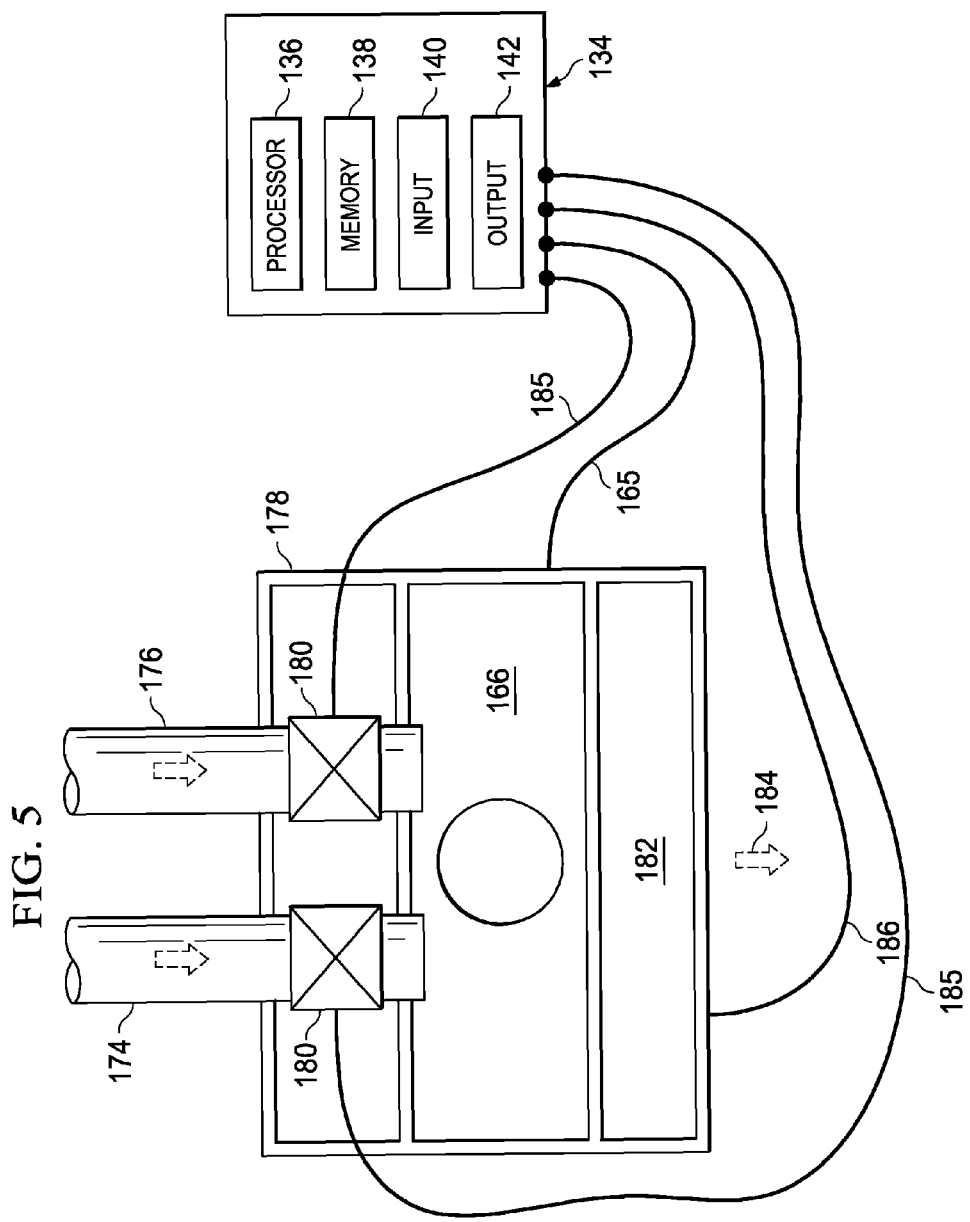
FIG. 5 is a schematic diagram of portion of an HVAC having a leak detector according to an illustrative embodiment.

Referring now additionally to FIG. 5, the first probe 174 and second probe 176 are shown in more detail with associated components in one illustrative embodiment. For illustration purposes, a plurality of valves 180 is shown. In addition a sample blower 182 is shown that pulls fluid 184 through either open probe 174, 176 across the flammable-component detector 166. The plurality of valves 180 is controlled by the processing unit 134 and is shown communicatively coupled by wires 185 but of course it could be coupled by wireless or by other communication techniques. Similarly, the sample blower 182 may be controlled by the processing unit 134 and is shown coupled by wire 186 but of course it could be coupled by wireless or by other communication techniques.

In some embodiments, only valves are needed because of the flammable-component detector 166 is positioned at a location where any leaking refrigerant will run through the probe to the flammable-component detector 166. In some embodiments, a sample blower 182 may be added to pull sample fluid past the flammable-component detector 166 and be used with valves 178, 180 or may be blowers individually associated with the probes 174, 176 and individually activated. The flammable-component detector 166 may, for example, be used for ten seconds with the first probe 174 and then for ten second with the second probe 176 and so forth. Other time intervals may be used. This approach allows one flammable-component detector 166 to monitor two spaces. It will be appreciated that this approach may be extended to a third space with a third probe and so on.

Figure 6:
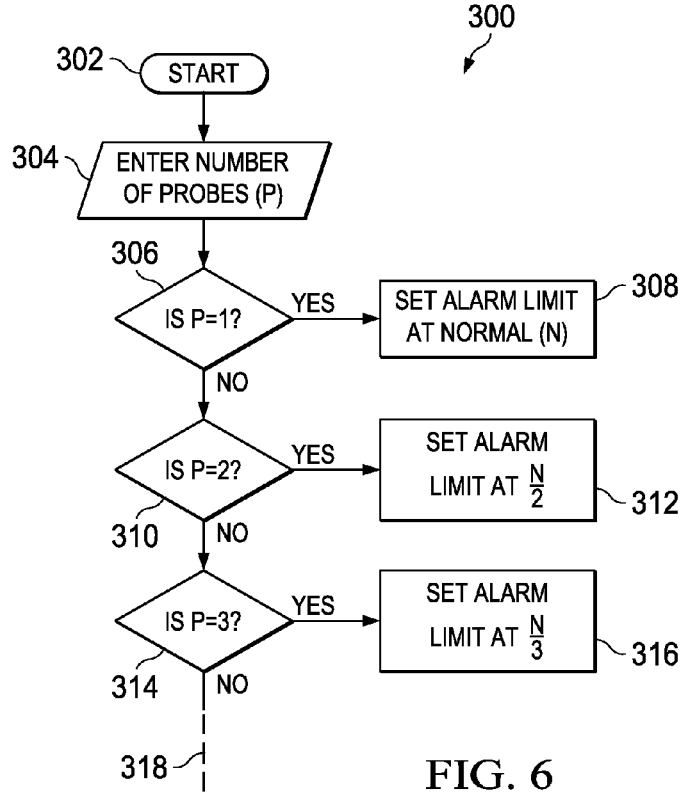
FIG. 6 is an illustrative flow chart of an aspect of a method of detecting a refrigerant leak according to an illustrative embodiment.

With respect to the monitoring of the flammable-component detector 166 by the processing unit, it will be appreciated that the fluid delivered by each probe 174, 176 may be diluted by the fluid in the other, and accordingly the alert threshold may be set to account for the dilution. This is shown in an the illustrative process flow of FIG. 6.

It will be appreciated that the processing unit 134 of FIGS. 4-5 may be configured to carryout numerous steps or functions within the system 100. As one example, reference is now made primarily to FIG. 6. The process 300 begins at 302 and at 304 the number of probes (P) is entered. For example, if the system of FIG. 5 were involved, two would be entered. If the number of probes were one, the process proceeds from interrogatory 306 to step 308, which sets the alert threshold at a normal limit (N), e.g., 25% lower flammability limit. If the answer to interrogatory 306 is negative, interrogatory 310, which asks if there are two probes, is considered. If there are two probes, at step 312, the alert threshold is set to ½ of normal limit (N), or base limit, e.g., 12.5% of the lower flammability limit (if the normal limit is 25% of the lower flammability limit).

If the answer to interrogatory 310 is negative, interrogatory 314, which asks if there are three probes, is reached. If affirmative, at step 316 the alert threshold is set to ⅓ of normal limit (N), e.g., 8.3% lower flammability limit (if the normal limit is 25% of the lower flammability limit). This approach could continue as suggested by 318 to accommodate other numbers of probes.

In one embodiment, the processing unit 134 considers samples from both probes 174, 176 and compares the results against each other. In this way, errors from calibration or drift may be cancelled out. If the difference between the two is greater than a difference threshold, an alert is triggered.

According to an illustrative embodiment, an HVAC system for providing conditioned air to a first closed space is provided, wherein at least a portion of the system is disposed within a second closed space, includes a cooling unit including a flammable refrigerant and at least one compartment wall separating the cooling unit from an equipment space. The at least one compartment wall is formed with an access port therethrough. The system further includes a controllable damper associated with the access port for selectively covering the access port and a flammable-component detector disposed within the equipment space proximate the access port, which is through the at least one compartment wall. The system also includes a processing unit communicatively coupled to the damper for opening and closing the damper.

Unless otherwise specified, any use of any form of the terms "connect," "engage," "couple," "attach," or any other term describing an interaction between elements is not meant to limit the interaction to direct interaction between the elements and may also include indirect interaction between the elements described. Coupling includes in some instances communicatively coupled, which may be a wireless connection or a wired connection. Coupled in some instances may refer to fluid coupling. In the discussion herein and in the claims, the terms "including" and "comprising" are used in an open-ended fashion, and thus should be interpreted to mean "including, but not limited to . . . "

It will be understood that the benefits and advantages described above may relate to one embodiment or may relate to several embodiments. It will further be understood that reference to "an" item refers to one or more of those items.

The steps of the methods described herein may be carried out in any suitable order, or simultaneously where appropriate.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. An HVAC system for providing conditioned air to a first closed space, which is an interior of a building, wherein at least a portion of the system is disposed within a second closed space, the system comprising:
    an HVAC unit comprising:
        a return air duct,
        a blower fluidly coupled to the return air duct for pulling air through the return air duct, a conditioning compartment fluidly coupled to the blower for receiving air therefrom to be treated, wherein the conditioning compartment is formed with a sampling port;
        a damper for selectively covering and uncovering the sampling port in response to a damper-control signal;
        a cooling unit fluidly coupled to the conditioning compartment for selectively cooling air therein, wherein the cooling unit comprises a flammable refrigerant, and
        a delivery duct fluidly coupled to the conditioning compartment for discharging treated air from the conditioning compartment into the first closed space;
    a flammable-refrigerant detector disposed within the second closed space and positioned proximate the sampling port of the HVAC unit such that flammable refrigerant within the conditioned compartment would flow through the sampling port when the damper is open and onto the flammable-refrigerant detector, wherein the flammable-refrigerant detector is operable to produce a detection signal; and
    a processing unit comprising at least one processor and at least one memory, the processing unit communicatively coupled to the flammable-refrigerant detector for receiving the detection signal therefrom and coupled to the damper for selectively providing the damper-control signal, wherein the processing unit is configured to open the damper when the blower is not operating and close the damper when the blower is operating.

2. The system of claim 1, wherein the processing unit is further communicatively coupled to the blower to receive an operational-status signal from the blower, and wherein the at least one processor and at least one memory are configured to perform the following steps:
    receive the operational-status signal from the blower;
    open the damper when the operational-status signal from the blower indicates that the blower is not operating; and
    close the damper when the operational-status signal from the blower indicates that the blower is operating.

3. The system of claim 1, wherein the processing unit is further communicatively coupled to the blower to receive an operational-status signal from the blower, and wherein the at least one processor and at least one memory are configured to perform the following steps:
    receive an operational-status signal from the blower;
    open the damper when the operational-status signal from the blower indicates that the blower is not operating;
    close the damper when the operational-status signal from the blower indicates that the blower is operating;
    monitor the detection signal from the flammable-refrigerant detector; and
    send an alert when the detection signal is indicative of a flammable component at least equal to an alert threshold.

4. The system of claim 3, further comprising:
    a display disposed within the first closed space, wherein the display is communicatively coupled to the processing unit; and
    wherein display is operable to receive the alert from the processing unit and provide a sensory alert.

5. The system of claim 3, further comprising:
    a display disposed within the first closed space, wherein the display is communicatively coupled to the processing unit;
    wherein display is operable to receive the alert from the processing unit and provide a sensory alert, wherein the sensor alert is a visual alert.

6. The system of claim 3, further comprising:

a display disposed within the first closed space, wherein the display is communicatively coupled to the processing unit;
wherein display is operable to receive the alert from the processing unit and provide a sensory alert, wherein the sensor alert is an audible alert.

7. The system of claim 1, wherein the processing unit is further communicatively coupled to the blower to receive an operational-status signal from the blower and to provide blower-control signal thereto, and wherein the at least one processor and at least one memory are configured to perform the following steps:
   receive an operational-status signal from the blower;
   open the damper when the operational-status signal from the blower indicates that the blower is not operating;
   close the damper when the operational-status signal from the blower indicates that the blower is operating;
   monitor the detection signal from the flammable-refrigerant detector;
   send an alert when the detection signal is indicative a flammable component at least equal to an alert threshold; and
   send the blower-control signal to activate the blower in response a detection signal indicative of a flammable component at least equal to the alert threshold.

8. The system of claim 1, further comprising a ventilation blower disposed within the second closed space and communicatively coupled to the processing unit for receiving a ventilation-activation signal and wherein the processing unit is further communicatively coupled to the blower to receive an operational-status signal from the blower and to provide blower-control signal thereto, and wherein the at least one processor and at least one memory are configured to perform the following steps:
   receive an operational-status signal from the blower;
   open the damper when the operational-status signal from the blower indicates that the blower is not operating;
   close the damper when the operational-status signal from the blower indicates that the blower is operating;
   monitor the detection signal from the flammable-refrigerant detector;
   send an alert when the detection signal is indicative a flammable component at least equal to an alert threshold; and
   send the blower-control signal to activate the blower in response a detection signal indicative of a flammable component at least equal to the alert threshold and send the ventilation-activation signal to the ventilation blower.

9. The system of claim 1, further comprising a cooling subsystem, the cooling subsystem comprising:
   a closed-conduit pathway, wherein the flammable refrigerant is disposed within the closed conduit pathway;
   a compressor fluidly coupled to the closed-conduit pathway for compressing the refrigerant;
   a condenser fluidly coupled to the closed-conduit pathway downstream of the compressor for cooling the refrigerant;
   an expansion device coupled to the closed-conduit pathway downstream of the condenser for decreasing a pressure of the refrigerant; and
   the cooling unit having a heat-exchange surface and fluidly coupled to the closed-conduit pathway for receiving the flammable refrigerant.

10. The system of claim 1, wherein the HVAC unit further comprises a heating device fluidly coupled to the conditioning compartment for selectively heating air therein.

11. The system of claim 10, wherein the heating device is a furnace.

12. The system of claim 10, wherein the heating device is an electrical heating element.

13. An HVAC system for providing conditioned air to a first closed space, which is an interior of a building, wherein at least a portion of the system is disposed within a second closed space, the system comprising:
   a cooling unit comprising a flammable refrigerant;
   at least one compartment wall separating the cooling unit from an equipment space, wherein the at least one compartment wall is formed with an access port therethrough;
   a controllable damper associated with the access port for selectively covering the access port;
   a flammable-refrigerant detector disposed within the equipment space proximate the access port through the at least one compartment wall; and
   a processing unit communicatively coupled to the damper for opening and closing the damper, wherein the processing unit is configured to open the damper when the blower is not operating and close the damper when the blower is operating.

* * * * *